US010604589B2

(12) United States Patent
Tienvieri et al.

(10) Patent No.: US 10,604,589 B2
(45) Date of Patent: Mar. 31, 2020

(54) METHOD FOR CATALYTIC OXIDATION OF CELLULOSE AND METHOD FOR MAKING A CELLULOSE PRODUCT

(71) Applicant: UPM-KYMMENE CORPORATION, Helsinki (FI)

(72) Inventors: Taisto Tienvieri, Vantaa (FI); Isko Kajanto, Espoo (FI); Tero Ojala, Oravala (FI); Sami Saarela, Helsinki (FI); Markus Nuopponen, Helsinki (FI); Timo Paakkonen, Helsinki (FI); Tapani Vuorinen, Espoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 475 days.

(21) Appl. No.: 14/650,666

(22) PCT Filed: Dec. 13, 2013

(86) PCT No.: PCT/FI2013/051166
§ 371 (c)(1),
(2) Date: Jun. 9, 2015

(87) PCT Pub. No.: WO2014/091086
PCT Pub. Date: Jun. 19, 2014

(65) Prior Publication Data
US 2015/0322171 A1    Nov. 12, 2015

(30) Foreign Application Priority Data

Dec. 13, 2012  (FI) ..................................... 20126306

(51) Int. Cl.
*C08B 15/04*    (2006.01)
*D21C 9/00*    (2006.01)

(52) U.S. Cl.
CPC ............... *C08B 15/04* (2013.01); *D21C 9/00* (2013.01); *Y10T 428/298* (2015.01)

(58) Field of Classification Search
CPC .......... C08B 15/04; D21C 9/00; Y10T 42/298
See application file for complete search history.

(56) References Cited

U.S. PATENT DOCUMENTS

| 6,379,494 | B1 | 4/2002 | Jewell et al. | |
| 6,409,881 | B1* | 6/2002 | Jaschinski | C08B 15/005 |
| | | | | 162/100 |
| 6,716,976 | B1 | 4/2004 | Jetten et al. | |
| 6,770,168 | B1* | 8/2004 | Stigsson | D21C 1/06 |
| | | | | 162/24 |
| 6,919,447 | B2 | 7/2005 | Komen et al. | |
| 7,001,483 | B2* | 2/2006 | Severeid | D21C 9/10 |
| | | | | 162/157.6 |
| 9,410,285 | B2 | 8/2016 | Vuorinen et al. | |
| 2005/0121159 | A1 | 6/2005 | Jetten et al. | |
| 2005/0121160 | A1 | 6/2005 | Jetten et al. | |
| 2009/0107642 | A1* | 4/2009 | Snekkenes | D21C 9/147 |
| | | | | 162/17 |
| 2012/0130064 | A1* | 5/2012 | Isogai | D06M 11/01 |
| | | | | 536/56 |
| 2012/0297555 | A1 | 11/2012 | Chene et al. | |
| 2014/0014283 | A1* | 1/2014 | Lindstrom | D21H 11/18 |
| | | | | 162/19 |
| 2014/0249305 | A1 | 9/2014 | Tanaka et al. | |
| 2016/0160440 | A1 | 6/2016 | Pääkkönen et al. | |
| 2016/0201261 | A1 | 7/2016 | Nuopponen et al. | |

FOREIGN PATENT DOCUMENTS

| AT | 501929 A1 | 12/2006 |
| CN | 1324784 A | 12/2001 |
| CN | 1341125 A | 3/2002 |
| CN | 101772517 A | 7/2010 |
| CN | 102652154 A | 8/2012 |
| CN | 102675475 A | 9/2012 |
| CN | 102776594 A | 11/2012 |
| CN | 102787444 A | 11/2012 |
| EP | 0226414 A2 | 6/1987 |
| EP | 1149846 A1 | 10/2001 |
| EP | 1245722 A2 | 10/2002 |
| EP | 1264845 A2 | 12/2002 |
| EP | 1505199 A1 | 2/2005 |
| EP | 2216345 A1 | 8/2010 |
| EP | 2574633 A1 | 4/2013 |
| EP | 2784209 A1 | 10/2014 |
| EP | 2226414 B1 | 12/2014 |
| FI | 20115566 A2 | 12/2012 |

(Continued)

OTHER PUBLICATIONS

Saito et al. Cellulose Nanofibers Prepared by TEMPO-Mediated Oxidation of Native Cellulose. Biomacromolecules. vol. 8. No. 8, 2007, pp. 2485-2491.*
Anelli et al., "Fast and Selective Oxidation of Primary Alcohols or to Carboxylic Acids and of Secondary Alcohols to Ketones Mediated by Oxoammonium Salts under Two-Phase Conditions" J. Org. Chem., vol. 52, No. 12, (1987) p. 2559-2562.
International Search Report dated May 8, 2014; International Application No. PCT/FI2013/051166; International Filing Date Dec. 13, 2013 (4 pages).
Saito et al., "Cellulose Nanofibers Prepared by TEMPO-Mediated Oxidation of Native Cellulose" Biomacromolecules 2007, 8, 2485-2491.
Written Opinion dated May 8, 2014; International Application No. PCT/FI2013/051166; International Filing Date Dec. 13, 2013 (6 pages).

(Continued)

*Primary Examiner* — Amina S Khan
(74) *Attorney, Agent, or Firm* — Cantor Colburn LLP

(57) ABSTRACT

Cellulose is oxidized catalytically using a heterocyclic nitroxyl radical as catalyst, main oxidant acting as oxygen source, and an activator of the heterocyclic nitroxyl radical. The oxidation is performed in a reaction medium which is at medium consistency of cellulosic pulp, which is above 6%, more preferably equal to or higher than 8%, and most preferably in the range of 8-12%. The reaction medium is mixed in a reactor through circulation of the reaction medium back to the reactor.

30 Claims, 3 Drawing Sheets

(56) References Cited

FOREIGN PATENT DOCUMENTS

| | | |
|---|---|---|
| JP | 0463901 A | 11/1971 |
| JP | 46003901 | 11/1971 |
| JP | H10251302 | 9/1998 |
| JP | 2001329001 | 11/2001 |
| JP | 2003073402 | 3/2003 |
| JP | 2003512540 A | 4/2003 |
| JP | 2009068014 | 4/2009 |
| JP | 2009161613 A | 7/2009 |
| JP | 2009209218 A | 9/2009 |
| JP | 2011184475 | 9/2011 |
| JP | 2011195660 | 10/2011 |
| JP | 2011219551 | 11/2011 |
| JP | 2012188472 | 10/2012 |
| JP | 2012207135 A | 10/2012 |
| JP | 20130960309 | 5/2013 |
| JP | 2014040530 A | 3/2014 |
| WO | 0050462 | 8/2000 |
| WO | 0123909 A1 | 4/2001 |
| WO | 0129309 A1 | 4/2001 |
| WO | 2005058972 A1 | 6/2005 |
| WO | 2009021688 A1 | 2/2009 |
| WO | 2009111915 A1 | 9/2009 |
| WO | 2011024807 A1 | 3/2011 |
| WO | 2012115590 A1 | 8/2012 |
| WO | 2012150701 A1 | 11/2012 |
| WO | 2012168562 A1 | 12/2012 |
| WO | 2013047218 A1 | 4/2013 |
| WO | 2013137140 A1 | 9/2013 |

OTHER PUBLICATIONS

Zhao et al., Oxidation of Primary Alcohols to Carboxylic Acids With Sodium Chlorite Catalyzed by Tempo and Bleach: 4-Methoxyphenylacetic Acid (Benzeneacetic acid, 4-methoxy-); Organic Syntheses, vol. 81, p. 195-203 (2005).

"Biological technology of fibers", the 2nd ed. Chen Hongzhang, Chemical Industry Publisher, Feb. 28, 2011, pp. 19-21.

"Cellulose ether", Shao Ziqiang, Chemical Industry Publisher, Sep. 31, 2007, pp. 12-14.

Chinese Office Action for Chinese Patent Application No. 201480053544.2, dated Feb. 4, 2017; 8 Pages.

Chinese Office Action for Chinese Patent Application No. 201480053544.2, dated Feb. 4, 2017; English Translation; 10 Pages.

European Search Report for European Application No. 12735922.2, dated Aug. 16, 2017, 5 Pages.

Hirota et al., "Oxidation of regenerated cellulose with NaClO2 catalyzed by TEMPO and NaClO under acid-neutral conditions" Carbohydrate Polymers 78 (2009) 330-335.

Isogai, A., et al., "Preparation of Polyuronic Acid from Cellulose by TEMPO-mediated Oxidation" Cellulose (1998) vol. 5, 153-164.

Jiang, N. et al. "Cu(II) Selective Aerobic Oxidation of Alcohols under Mllg Conditions", J. Org. Chem. 2006, vol. 71, pp. 7087-7090.

Mannam, S. et al. "Aerobic, Chemoselective Oxidation of Alcohols to Carbonyl Compounds Catalysed by a DABCO-Copper Complex Under Mild Conditions", Adv. Synth. Catal. 2007, vol. 349, pp. 2253-2258.

* cited by examiner

METHOD FOR CATALYTIC OXIDATION OF CELLULOSE AND METHOD FOR MAKING A CELLULOSE PRODUCT

FIELD OF THE INVENTION

The invention relates to a method for catalytic oxidation of cellulose using a heterocyclic nitroxyl radical as catalyst.

BACKGROUND OF THE INVENTION

Cellulose is a renewable natural polymer that can be converted to many chemical derivatives. The derivatization takes place mostly by chemical reactions of the hydroxyl groups in the β-D-glucopyranose units of the polymer. By chemical derivatization the properties of the cellulose can be altered in comparison to the original chemical form while retaining the polymeric structure. Reaction selectivity is important so that a derivative of desired chemical structure could be obtained.

Heterocyclic nitroxyl compounds are known as catalysts that participate in the selective oxidation of C-6 hydroxyl groups of cellulose molecules to aldehydes and carboxylic adds, the corresponding oxoammonium salt being known as the active direct oxidant in the reaction series. One of these chemical oxidation catalysts known for a long time is "TEMPO", i.e. 2,2,6,6-tetramethylpiperidinyl-1-oxy free radical. Thus, the oxidized forms of the nitroxyl radicals, N-oxoammoniumions, act as direct oxidants in the oxidation of the target cellulose molecule, whereas a main oxidant is used to bring oxygen to the reaction series and convert the nitroxyl compound back to the oxidized form.

It is known to oxidize primary alcohols to aldehydes and carboxylic acids through "TEMPO" by using sodium hypochlorite as the main oxidant (for example Anelli, P. L.; Biffi, C.; Montanari, F.; Quici, S.; *J. Org. Chem.* 1987, 52, 2559). To improve the yield in the oxidation of the alcohols to carboxylic acids, a mixture of sodium hypochlorite and sodium chlorate was also used (Zhao, M. M.; Li, J.; Mano, E.; Song, Z. J.; Tschaen, D. M.; *Org. Synth.* 2005, 81, 195).

It is also known procedure to catalytically oxidize cellulose in native cellulose fibers through "TEMPO" by using sodium hypochlorite as main oxidant (oxygen source) and sodium bromide as activator (Saito, T. et al.; Cellulose Nanofibers Prepared by TEMPO-Mediated Oxidation of Native Cellulose, *Biomacromolecules* 2007, 8, 2485-2491). The primary hydroxyl groups (C6-hydroxyl groups) of the cellulosic β-D-glucopyranose units are selectively oxidized to carboxylic groups. Some aldehyde groups are also formed from the primary hydroxyl groups. When the fibers of oxidized cellulose so obtained are disintegrated in water, they give stable transparent dispersion of individualized cellulose fibrils of 3-5 nm in width, that is, nanofibrillated cellulose (NFC) or "nanocellulose".

Selectivity of the oxidation is important so that chemicals used are not consumed to unwanted side reactions. Selectivity can be defined as ratio of carboxylic groups formed to the main oxidant consumed.

Normally the catalytic oxidation is done in LC (low consistency 1-4%) to have good mixing. Especially in the beginning of the reaction efficient mixing is important, because the reaction initially proceeds fast after the addition of NaClO is started. However, at this consistency range, the production costs are really higher because more chemicals are needed because of side reactions, and water consumption is high. The required size of the apparatus will also be higher because of large water volumes handled. Raising the consistency has not been considered a feasible alternative because the energy demand would rise too high to ensure efficient mixing by agitation. Intensive mixing also tends to rise the temperature of the reaction medium above the optimum range.

The use of sodium bromide as activator is preferred because it accelerates the reaction. For example WO01/29309 recommends to use 3 parts by weight NaBr to 4 parts of NaOCl. In the reaction series, the bromide ion acts as oxygen mediator between the main oxidant and the nitroxyl radical by oxidation to hypobromite and reduction back to bromide.

The use of bromine compounds in the oxidation reaction is problematic because of environmental concerns. Sodium bromide is usually used in the reaction mixture in relatively large amounts and it is difficult to remove bromide residues from the final cellulose product. Bromine compounds also accumulate in process waters. Further, the use of bromine in industrial scale is undesirable. Use of large amounts of sodium bromide cause corrosion problems in the equipment. Bromine compounds are generally recognized as hazardous to health, for example bromate which is formed as a result of side reactions is a suspected carcinogen.

SUMMARY OF THE INVENTION

It is a purpose of the invention to provide a method for effectively and selectively oxidizing the C-6 hydroxyl groups of cellulose.

It is a further object to provide a method for making nanofibrillar cellulose.

Selectivity can be increased by performing the oxidation at medium consistency, that is, at an initial consistency of the cellulosic raw material that is higher than normally used. The consistency of the pulp is above 6%, more preferably equal to or higher than 8%, and most preferably in the range of 8-12% by weight. Within the last-mentioned range, the optimum consistency seems to be in the range of 9-11%. In the reaction conditions, the medium-consistency pulp behaves, contrary to what might be expected, like low-consistency pulp, and the mixing can be performed in a simpler way without compromising the efficiency of the reaction.

The mixing at medium consistency is performed by circulating the reaction medium (mixture of the catalyst, cellulosic raw material, oxidant and other substances in liquid carrier). Circulating the reaction medium for example by a pump allows to mix the reaction medium with lower energy input, and excess heating due to intensive agitating is avoided. The temperature of the reaction can thus more easily be maintained in a range which does not exceed 40° C. The temperature is preferably kept at the optimal level of 25-35° C.

The cooling can be improved as a result of the circulation loop, where the reaction medium flows outside its main volume. The cooling can take place by the effect of surrounding ambient temperature or additional cooling during the flow of the reaction medium in the circulation loop.

The circulation of the reaction medium can be utilized also in dosing the various reactants to the reaction medium, because they can be at least partly dosed into the circulation flow of the reaction medium.

Further, by a proper choice of the activator the nitroxyl radical can be activated to the oxidized state without the use of bromide. In the medium-consistency oxidation process, the heterocyclic nitroxyl radical is preferably activated by chlorine dioxide. According to another alternative, the heterocyclic nitroxyl radical can be activated by a tertiary amine.

The main oxidant in the reaction is hypochlorite. Chlorine dioxide is used as the activator and hypochlorite, for example sodium hypochlorite (NaClO), as the main oxidant at a neutral or basic pH. The oxidation reaction is preferably performed to the desired conversion degree in this one step by circulating the reaction medium simultaneously through the circulation loop.

It is also possible to perform the conversion in a two-step process, where in a second step, the pH is made acidic and the remaining aldehyde groups of cellulose are oxidized to carboxylic groups by chlorite, for example sodium chlorite ($NaClO_2$). By using the two step method in the $ClO_2$ activation, the selectivity can be further improved and the total oxidation time from hydroxyl to carboxylate can be made shorter. However, when the reaction is performed at a higher consistency than usually, the side reactions harmful to the fibrous material are decreased, breakage of cellulose is avoided, and the DP value is better retained. Therefore, the one-step reaction is sufficient to retain the advantageous properties of the fibrous end product, and the change of the reaction conditions and reactants can be avoided when using the method.

After the cellulose is subjected to oxidation at the medium consistency, it can be processed to a final cellulose product. When the starting material is pulp derived from plants, especially wood, the cellulose exists in fiber form. The fibers that contain the cellulose in oxidized form are easy to disintegrate by mechanical methods to small-scaled fragments, nanofibrillar cellulose (NFC). The method for forming the cellulose product comprises the first process of catalytic oxidation of the fibrous starting material and the second process of disintegration the oxidized starting material to nanofibrillar cellulose.

BRIEF DESCRIPTION OF THE DRAWINGS

In the following, the invention will be described with reference to the appended drawings, where.

DETAILED DESCRIPTION OF THE PREFERRED EMBODIMENTS

In the following disclosure, all percent values are by weight, if not indicated otherwise. Further, all numerical ranges given include the upper and lower values of the ranges, if not indicated otherwise.

The primary hydroxyl groups of cellulose are oxidized catalytically by a heterocyclic nitroxyl compound, for example 2,2,6,6-tetramethylpiperidinyl-1-oxy free radical, "TEMPO". Other heterocyclic nitroxyl compounds known to have selectivity in the oxidation of the hydroxyl groups of C-6 carbon of the glucose units of the cellulose can also be used, and these compounds are widely cited in the literature. Hereinafter, the oxidation of cellulose refers to the oxidation of these hydroxyl groups to aldehydes and/or carboxyl groups. It is preferred that the hydroxyl groups are oxidized to carboxyl groups, that is, the oxidation is complete.

Whenever the catalyst "TEMPO" is mentioned in this disclosure, it is evident that all measures and operations where "TEMPO" is involved apply equally and analogously to any derivative of TEMPO or any heterocyclic nitroxyl radical capable of catalyzing selectively the oxidation of the hydroxyl groups of C-6 carbon in cellulose.

In the following description, catalytic oxidation refers to nitroxyl-mediated (such as "TEMPO"-mediated) oxidation of hydroxyl groups. The catalytic oxidation of fibers or fibrous material in turn refers to material which contains cellulose that is oxidized by nitroxyl-mediated (such as "TEMPO"-mediated) oxidation of hydroxyl groups of the cellulose.

When medium consistency of the pulp is used, the selectivity of the cellulose oxidation can be improved, because the desired reactions take place in the fiber, whereas the unwanted side reactions take place in the solution phase. At the starting pulp consistencies higher than 6%, the cellulose can be oxidized to the oxidation levels of 0.5-1.4 mmol COOH/g pulp, preferably 0.6-1.1 and most preferably 0.7-0.9 with high selectivity. Further, any other oxidation levels mentioned in this disclosure can be obtained at these higher starting pulp consistencies.

For the purpose of making nanofibrillar cellulose (NFC), it has been found that the oxidation level (conversion degree) of 0.5-1.0 mmol COOH/g pulp, preferably 0.6-0.95 and most preferably 0.7-0.9 is already sufficient that the cellulose fibers can be easily disintegrated to fibrils by mechanical energy. Conventionally, it has been the aim to reach conversion degrees above 1.0 mmol/g pulp for making NFC.

Figure 1:
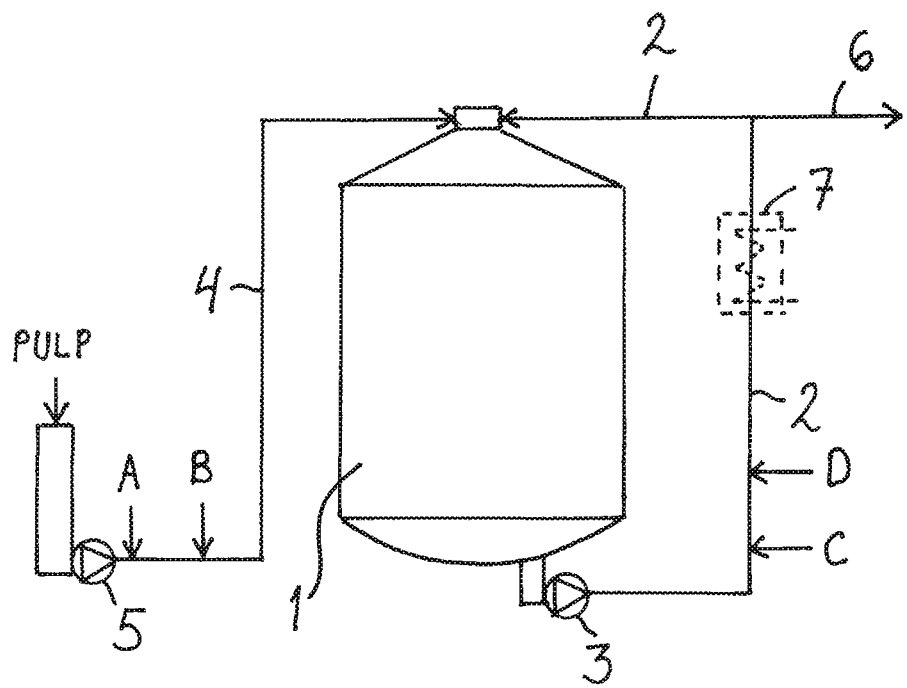
FIG. 1 shows the general principle of the method in form of a reaction apparatus

FIG. 1 shows a reaction apparatus according to a first embodiment. The apparatus comprises a substantially closed tank reactor 1 and a circulation loop 2, through which the reaction medium is taken from the tank reactor 1 and returned back to the tank reactor. The flow of the medium through the loop 2, which can be a pipe of suitable diameter, is caused by a circulation pump 3. The movement of the reaction medium through the loop will cause enough mixing inside the tank reactor. Internal moving agitators are not needed in the tank reactor or their mixing power can be lowered due to the sufficient mixing effect already caused by the circulation.

Feeding channel 4, through which the tank reactor 1 is initially filled with the reaction medium, can be also used for dosing the chemicals initially needed to start the oxidation reaction of cellulose. Feed pump is the feeding channel is denoted with 5. After the reaction is complete, the product is taken out through a product line 6 connected to the circulation loop 2. Valves necessary to control the direction of flows are not shown.

The chemicals that can be initially dosed to the reaction medium in the feeding channel 4 are the activated heterocyclic nitroxyl compound (arrow A) and the initial dose of the main oxidant, preferably hypochlorite, which is the oxygen source (arrow B). As the reaction proceeds, more main oxidant can be added to the circulation loop 2 (arrow C) and the pH control by alkaline agent addition can also accomplished through the circulation loop 2 (arrow D) to keep the pH of the reaction medium at the desired range.

The circulation loop will also cool the the reaction medium as it flows along the pipe in close proximity to the ambient temperature (room temperature) outside the pipe. Additional cooling can be provided in the circulation loop 2 by a heat exchanger 7. The tank reactor 1 itself needs not be a tank equipped with a cooling jacket, but it can be of simpler wall construction.

All constituents are supplied to the tank reactor so that the reaction medium is at medium consistency of above 6%, more preferably equal to or higher than 8%, and most preferably in the range of 8-12% when the oxidation process starts.

It is advantageous to add the main oxidant, such as hypochlorite, continuously as the oxidation of cellulose proceeds to avoid excess concentrations which may cause unwanted side reactions.

After the desired conversion degree has been attained, the reaction medium is taken out from the reactor through the product line 6. The fibres containing the oxidized cellulose are separated from the reaction medium, and the reaction medium is possibly reused. Regeneration measures making it possible to reuse at least some of the constituents of the reaction medium are not described herein in closer detail. The fibres are washed to remove the remnants of the chemicals and processed further, especially to NFC.

Figure 2:
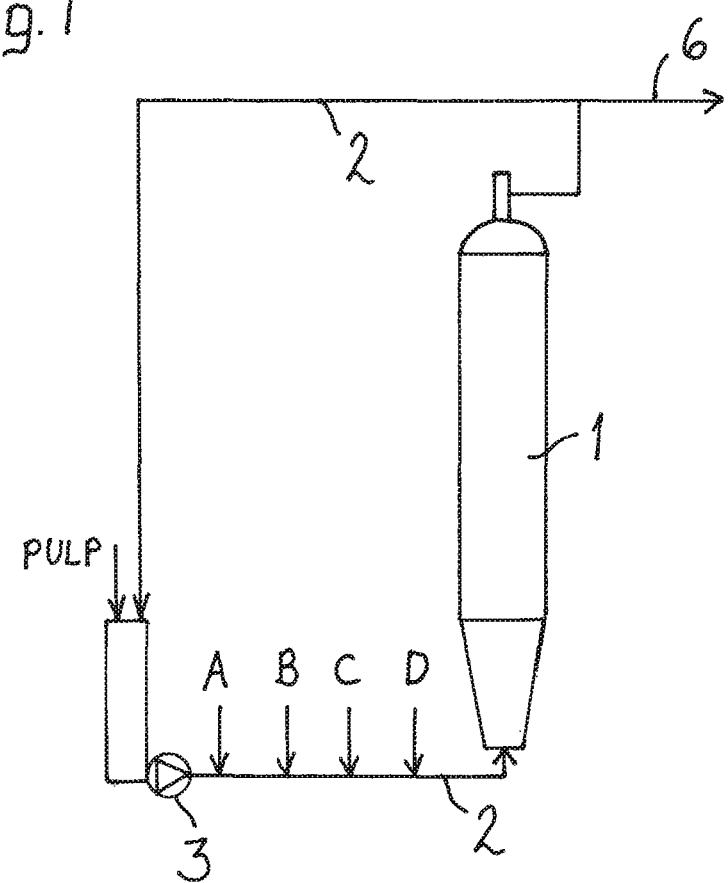
FIG. 2 shows a reaction apparatus according to another embodiment.

FIG. 2 shows another embodiment of the reaction apparatus. As the reaction medium was taken to the circulation loop 2 at the bottom of the tank reactor 1 and returned to the top of the reactor in the embodiment of FIG. 1, the flow of the medium is now inverse (exit to the loop 2 through the top and return from the loop 2 through the bottom). Reference numerals indicate parts with similar function as in FIG. 1. The reactor 1 is a plug-flow type reactor, which can be provided with static mixers inside the reactor. There is no separate feeding channel, but the circulation loop 2 can be used for feeding the initial constituents of the reaction medium and the chemicals needed (main oxidant and alkaline agent) as the oxidation proceeds. After the reaction is complete, the final steps are the same as in the embodiment of FIG. 1.

The mixing concepts of the reaction apparatuses of FIGS. 1 and 2 is based on the unexpected observation that the mixture of the chemicals in the reaction medium and the properties of the modified pulp make mixing in medium consistency easier than with normal pulp. Therefore reactors that do not apply so much energy (and increase the pulp temperature) are not needed. The chemical reactions change the pulp viscosity to such an extent that in the reactor LC (low consistency) mixing can be used. Probably also the high salt concentration in the medium consistency range facilitates mixing.

When the fibres are at higher consistencies, their separation of the liquid phase of the reaction medium is easier, and the washing is also simpler and easier. If the modified (oxidized) cellulose fibers are disintegrated into fibrils to make nanofibrillar cellulose, this can be done at higher consistency. Because the ratio of fibers to liquid is higher, reuse of the liquid reaction medium is easier because of smaller volumes of liquid to be handled. The recovery of the catalyst form the liquid medium for reuse purposes is also easier because of smaller volumes.

Although auxiliary mixing in the form of agitation inside the reaction tank can be used, first can be said that the main proportion of the mixing energy input to the reaction medium is due to the circulation. In the practice, the circulation pump output is higher than the agitator motor output, if auxiliary agitation is used.

In the following, some reaction procedures are given as examples. However, the method is not limited to given reaction schemes, but can be used in all reactions where cellulose existing in fibres is catalytically oxidized using the nitroxyl-mediated oxidation of hydroxyl groups of cellulose and which can be used in reaction apparatuses of FIGS. 1 and 2 at medium consistencies of the pulp.

According to preferred embodiment, chlorine dioxide is used as the activator of the heterocyclic N-nitroxyl compound. The main oxidant is hypochlorite. After the desired conversion degree has been reached by using these reagents, the reaction medium can be removed from the reactor, the fibers can be separated and treated further. The oxidation process can also be a two-step process where in the first step the nitroxyl catalyst is activated with chlorine dioxide and hypochlorite is used as the main oxidant. The reaction proceeds rapidly and produces partly aldehyde groups. The pH in the first phase is preferably between 7.5 and 8.5, these values included, but a wider range, from 6 to 10, may also be used. Compared with other activating methods, the activation with $ClO_2$ improves the oxidation selectivity outstandingly.

When the first step has proceeded to so that a desired conversion degree is reached, the first step is stopped. The partly oxidized cellulose can be washed and the second step is performed in a reaction medium where the pH is clearly on acidic side, about 1.5-4, preferably 2-3. Preferably the second step is performed at a pH below 3. The stop point of the first step can be chosen according to the consumption of the main oxidant or any other way. Alternatively, the pH of the reaction medium of the first step can be lowered directly to the pH range of the second step at the stop point.

When the pH is lowered, chlorite, for example $NaClO_2$, is added to the reaction medium. In this second step, the remaining aldehyde groups are rapidly oxidized to carboxyl groups with chlorite as the main oxidant. Dimethyl sulfoxide (DMSO) can be used in the reaction medium in the second step to eliminate the formation of hypochlorite from chlorite.

Usually the first step is stopped when the carboxylate content of 0.6-1.0 mmol/g pulp is reached. The second step increases the carboxylate content by completing the oxidation.

If the partly oxidized cellulose is washed between the steps, the reaction medium is taken from the tank reactor 1 as described above, and the new reaction medium which contains the cellulose partly oxidized in the first step is fed to the tank reactor. The second oxidation step can take place in a similar manner as the first step.

By the combination of first and second steps the overall reaction from hydroxyl groups until carboxyl groups is fast with good selectivity. The activation of the nitroxyl radical (for example "TEMPO" radical) to oxidized form by $ClO_2$ and further oxidation of C6 hydroxyl groups of pulp by hypochlorite as the main oxidant is a selective and fast reaction if all available hydroxyl groups are not oxidized. The residual aldehydes can be converted to carboxylates by the further acid phase (the second step). The acid phase in the end is preferable also in the sense that the oxidized pulp is easier to wash at acidic conditions.

The reaction scheme of the first step is given below in scheme 1. Chlorine dioxide is needed only for the conversion of the catalyst from the radical form to the active, oxidized form.

Scheme 1. TEMPO - catalyzed bleach-oxidation of alcohols using chlorine dioxide as activator

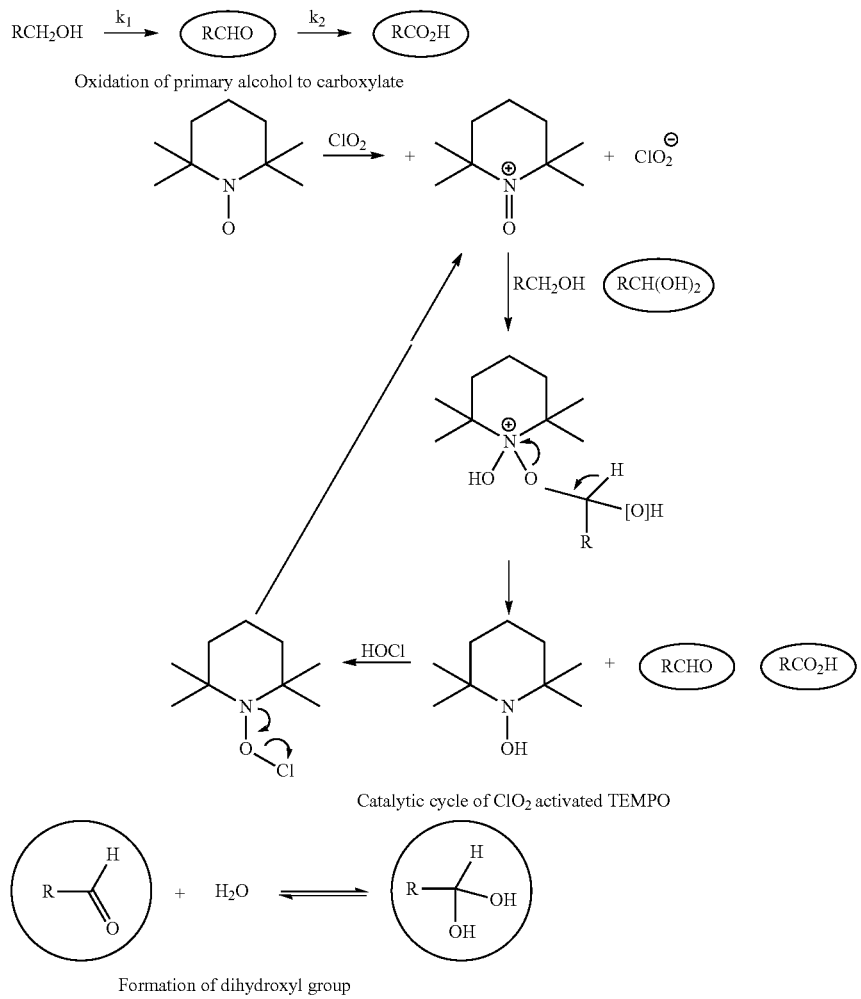

The conversion of residual aldehydes to carboxyl groups by oxidation in the second step stabilizes the oxidized cellulose. The reaction scheme is shown below.

Scheme 2. Chemical oxidation of aldehyde to carboxylic acid by chlorite. The chlorite is in the form of chlorous acid ($HClO_2$, pKa 1.96) in acidic conditions. The chlorous acid oxidizes the aldehyde groups of the cellulose to carboxylic acid groups. A typical pH range for this reaction is 2-4.

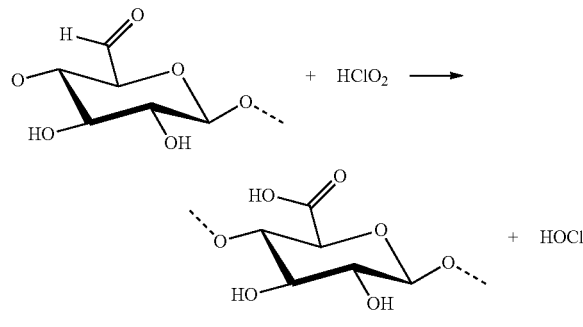

The temperature in the first step can be between 20 and 50° C. and in the second step between 20 and 80° C., preferably 40 and 80° C. The optimum temperature of the second step is about 50° C. However, due to the tendency of the hypochlorite to decompose, the optimum temperature of the first step is not higher than 40° C., preferably between 25-35° C., which is a good compromise of the high reaction rate and low consumption of hypochlorite and can be easily accomplished by reaction arrangements of FIGS. 1 and 2 at medium consistencies of the starting pulp.

According to another embodiment, the cellulose is oxidized at the medium consistency catalytically by using hypochlorite as main oxidant and tertiary amine as cocatalyst. The presumed route is shown in the following scheme 3 (the heterocyclic nitroxyl catalyst is represented by $R'_2NOH$ in its reduced form and $R'_2N+O$ in its oxidized form). Bromide is not needed in this process either.

Oxidation of Alcohol
$RCH_2OH + R'_2N'O \Rightarrow RCH_2ON'(OH)R'_2$
$RCH_2ON'(OH)R'_2 \Rightarrow RCHO + R'_2NOH$ Formation of Chlorammonium
$RR'R''N + HOCl \Rightarrow RR'R''N'Cl + H_2O$ Reoxidation of TEMPO
$R'_2NOH + RR'R''N'Cl \Rightarrow R'_2NOCl + RR'R''N + H'$
$R'_2NOCl \Rightarrow R'_2N'O + Cl'$ Oxidation of Aldehyde RCHO+HOCl⇨RCH(OH)OCl
RCH(OH)OCl⇨RCO$_2$H+Cl'

Scheme 3. TEMPO—catalyzed bleach-oxidation of alcohols using amine as cocatalyst.

The method is a one-step process where all reagents for achieving the oxidation are in the same reaction medium. However, the selectivity of the oxidation is higher when the main oxidant, NaClO is added in portions. The amine cocatalyst can also be added in portions during the reaction time, which increases the selectivity of the oxidation reaction. The pH used is slightly basic, 8 to 9.5. However, any pH value between 7 and 10, these values included, can also be used.

The reaction using the amine as cocatalyst can be performed at room temperature or slightly elevated temperature, in the range of 20-50° C., preferably 25-35° C., in the absence of added bromide.

Suitable tertiary amines are hexamethylenetetramine, 1,4-diazabicyclo[2,2,2]-octane (DABCO) and quinuclidine. However, the invention is not limited to the use of these amines as cocatalysts. Other stable amines, especially stable cyclic amines can be used.

The method of oxidizing xellulose cartalytically in the medium consistency using the reaction arrangements exemplified by FIGS. 1 and 2 is not, however, limited to oxidizing chemicals and activators expressly mentioned above.

The reaction medium in all methods described above is preferably water where the reagents and raw materials can be dissolved or dispersed.

In the present application all results shown and calculations made, whenever they are related to the amount of pulp, are made on the basis of dried pulp.

In general, the cellulose oxidized at the medium consistency of the pulp can be oxidized selectively to a desired conversion degree which is not full conversion but a conversion where it can be mechanically processed as described later, without loss of material. The reached conversion in the end of the process (in one-step or two-step) is 0.5-1.4 mmol COOH/g pulp, preferably 0.6-1.1 mmol COOH/g pulp, most preferably 0.7-0.9 mmol COOH/g pulp.

The dosage of hypochlorite to cellulose, to reach the above-mentioned conversions, can be 1.7 to 5 mmol/g pulp, preferably 2.2-2.7 mmol/g pulp.

In all above-described embodiments the catalytic oxidation can be performed without the use of bromide. Sodium bromide, which is conventionally used as activator and cocatalyst because of the faster reaction rate and high degree of oxidation, can be avoided in the catalytic oxidation process according to still one embodiment. Conventionally, the optimum pH when sodium bromide is used is 10. However, side reactions occur at this pH which cannot be avoided even at the relatively fast reaction rate. The DP value (degree of polymerization) will decrease considerably, which decreases the strength characteristics and gel forming ability of the NFC.

Thus, according to still one embodiment, the catalytic non-bromine oxidation with the heterocyclic nitroxyl radical as catalyst at the medium consistency of the pulp can be performed by using carefully defined conditions with regard to pH and temperature. The reaction is performed in neutral or slightly alkaline pH, in the range of 7-9, and at room temperature or slightly elevated temperature, in the range of 20-50° C., preferably 25-35° C., in the absence of added alkali metal halide. The selectivity (less C2 ja C3 reactions) is improved, and bromine compounds are avoided. The slower oxidation reaction rate due to the lower pH is compensated by the temperature, which does not increase the side reactions as much as the higher pH. Chlorine oxide or any other activator can be used instead of alkali metal halide in the first step of catalytic oxidation with the hypochlorite as main oxidant using the above pH and temperature conditions. The second step of completing the oxidation is not necessarily needed, but if the residual aldehyde groups are to be oxidizided to carboxyl groups, it is preferably performed by using chlorite as oxidant and protective substances for preventing unwanted side reactions in the second step, as explained above.

Thus, for the purpose of making NFC, it has been found that the oxidation level (conversion degree) of 0.5-1.0 mmol COOH/g pulp, preferably 0.6-0.95 and most preferably 0.7-0.9 is already sufficient that the cellulose fibers can be easily disintegrated to fibrils by mechanical energy. To reach this level, the one step oxidation process (only the first step of catalytic oxidation, irrespective of the activator of the catalyst) is usually sufficient. However it is also possible to complete the oxidation in the second step by oxidizing the residual aldehydes to carboxyl groups to obtain cellulose with the above-mentioned oxidation levels indicated as COOH/g pulp.

When the higher consistency than conventionally is used (above 6%, more preferably equal to or higher than 8%, and most preferably in the range of 8-12%), the selectivity of the cellulose oxidation can be further improved, because the desired reactions take place in the fiber, whereas the unwanted side reactions take place in the solution phase. At these starting pulp consistencies, the cellulose can be oxidized to the above-mentioned oxidation levels of 0.5-1.0 mmol COOH/g pulp, preferably 0.6-0.95 and most preferably 0.7-0.9, either in the one step oxidation process or using the second step to complete the oxidation. Further, any other oxidation levels mentioned in this disclosure can be obtained at these higher than usual starting pulp consistencies (medium consistencies), either in the one-step oxidation process or using the second step after the first step in the reaction arrangements of FIGS. 1 and 2.

At the above relatively low oxidation levels of 0.5-1.0 mmol COOH/g pulp, preferably 0.6-0.95 and most preferably 0.7-0.9, it is possible to obtain a stronger gel, when the fibers are disintegrated to fibrils, because there is less β-elimination. Thus, a lower degree of oxidation lowers the expenses on chemicals and helps to make a product of improved strength.

The fibrous starting material, which can be pulp of plant origin, especially wood (softwood or hardwood pulp, for example bleached birch pulp) and where the cellulose molecules are oxidized in one of the above-described methods, is easy to disintegrate to nanofibrillar size, nanofibrillar cellulose or NFC.

The term "nanofibrillar cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 µm. The smallest microfibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of the oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer.

The NFC prepared from cellulose raw material oxidized with the methods above has excellent gelling ability, which means that it forms a gel at a low consistency in aqueous medium. When the oxidized pulp is ground at a consistency of about 1 to 4% in aqueous medium, a clear gel consisting of microfibrils in water (NFC gel) is obtained.

In any of the preceding oxidation processes, the carboxylate content of 0.9-1.2 mmol COOH/g starting pulp (on dry matter), preferably 1.0-1.1 mmol COOH/g pulp is desirable so that the gel formation as a result of mechanical disintegration would be easy. However, as stated above, the carboxylate contents below 1.0 mmol are already sufficient to make NFC and they are preferred if gel strength is preferred.

Before the oxidized pulp is disintegrated to make the NFC, the pH of the medium is adjusted to 7-10, preferably 7-9, and most preferably to 7-8.5, which lowers the energy needed.

The obtained NFC gel is characterized by shear thinning behaviour. The mean diameter of the microfibrils is 2-20 nm, preferably 2-6 nm, and the mean length is in the range of 0.3-5.0 μm, preferably 0.5 to 2 μm. The turbidity is below 70, preferably 20 to 60 NTU (0.1% concentration, nephelometric measurement). Measured at a 0.5% concentration in water, the gel has zero shear viscosity of 10000-50000 Pa·s, preferably 20000-50000 Pa·s if gel strength properties of the NFC are preferred, and yield stress of 8-40 Pa, preferably 10-30 Pa.

In the following some experiments are described which shall not be regarded as limiting.

Oxidations at Medium Consistency

Figure 3:
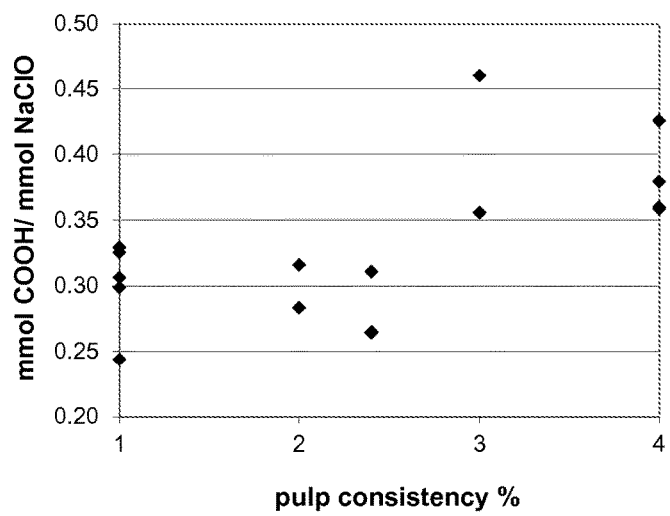
FIG. 3-5 show results of some oxidation experiments.

Some oxidations were carried out with MC mixer at the consistency of 10% and some with MC pulper at the consistency up to 11%. The oxidation at a high consistency is, in theory, more selective, because the desired reactions take place in the fibre and the undesired side reactions take place in the solution phase. In practice, it has been possible to reduce the amount of the TEMPO catalyst and the chlorine dioxide in relation to the fibre quantity dosed by increasing the consistency. In our tests, we did not find problems in carrying out oxidations with TEMPO at increased consistencies up to medium consistencies. Typical reactions given in the prior art are carried out at a consistency of 1%, and not higher than 4%. FIG. 3 shows that the selectivity of the oxidation (formed carboxylic acids per consumed hypochlorite) is improved when the consistency is increased in a low consistency range, 1 to 4%.

Table 2 shows oxidation results at a consistency of 10% (MC mixer). During oxidation, a MC mixer does not provide mixing corresponding to mixing with a Buchi reactor (consistency 1 to 4%). Also the dosage of NaClO and the pH regulation are less accurate. Oxidation is good also at a consistency of 10%, and even better results can be obtained by using an apparatus with more accurate chemical dosage and pH regulation. Consequently, the results at medium consistency are promising. Table 3 shows oxidations carried out with a Buchi reactor at a consistency of 4%. Also included are two TEMPO derivatives: 4-methoxy-TEMPO and 4-acetamido-TEMPO. On the basis of the tests, it can be said that chlorine dioxide can be used to activate not only TEMPO but also TEMPO derivatives. The dosage of TEMPO can also be decreased (pulp 149 to 150) so that the selectivity of the oxidation is maintained. What is essential in optimizing the dosage of the catalyst to a lower level is to optimize the feeding of NaClO/NaOH simultaneously during the oxidation. It is clear that the TEMPO-derivatives and other conditions in table 3 can also be used at medium consistencies.

TABLE 2

TEMPO oxidations activated with chlorine dioxide with a MC mixer at a consistency of 10%.

| | Experiment | | | | | | | |
|---|---|---|---|---|---|---|---|---|
| | pulp 112 | pulp 113 | pulp 114 | pulp 115 | pulp 116 | pulp 117 | pulp 118 | pulp 120 |
| HOCl addition (mmol NaClO/g pulp) | 3.8 | 1.8 | 1.8 | 1.8 | 2.0 | 4.4 | 4.5 | 4.5 |
| TEMPO addition (mmol/g pulp) | 0.03 | 0.03 | 0.03 | 0.015 | 0.03 | 0.03 | 0.03 | 0.03 |
| Molar ratio ClO$_2$/TEMPO | 2.2 | 1.8 | 1.7 | 2.7 | 2.7 | 2.9 | 3.8 | 5.7 |
| mmol/g pulp (1 phase oxidation) | 0.82 | 0.55 | 0.55 | 0.48 | 0.55 | 1.11 | 1.07 | 0.95 |
| mmol/g pulp (2 phase oxidation) | | | 0.72 | 0.63 | 0.80 | 1.14 | 1.17 | 1.13 |
| Viscosity (ml/g) (1 phase oxidation) | 137 | 164 | 196 | 179 | 159 | 135 | 129 | 153 |
| Viscosity (ml/g) (2 phase oxidation) | | | 382 | 213 | 298 | 145 | 205 | 225 |
| Selectivity after 2 phase (mmol COOH/mmol NaClO) | | | | 0.31 | 0.34 | 0.25 | 0.25 | 0.23 |
| Temperature (° C.) | 25 | 25 | 25 | 25 | 25 | 25 | 25 | 25 |

TABLE 3

TEMPO oxidations activated with chlorine dioxide with a Buchi reactor at a consistency of 4%.

| | Experiment | | | | | | | | |
|---|---|---|---|---|---|---|---|---|---|
| | pulp 132 | pulp 139 | pulp 140 | pulp 141 | pulp 142 | pulp 143 | pulp 144 | pulp 149 | pulp 150 |
| TEMPO derivative | A | B | B | C | C | C | C | C | C |
| Reaction time (min) | 150 | 240 | 100 | 255 | 150 | 220 | 210 | 360 | 360 |
| HOCl addition (mmol NaClO/g pulp) | 2.3 | 2.3 | 2.3 | 2.3 | 2.3 | 2.3 | 2.3 | 2.3 | 2.3 |
| TEMPO addition (mmol/g pulp) | 0.05 | 0.05 | 0.05 | 0.05 | 0.075 | 0.05 | 0.05 | 0.04 | 0.025 |
| Molar ratio TEMPO/ClO$_2$ | 1.9 | 1.9 | 1.9 | 1.4 | 1.2 | 1.2 | 1.27 | 1.33 | 1.27 |
| mmol/g pulp (1 phase oxidation) | 0.76 | 0.78 | 0.75 | 0.68 | 0.59 | 0.65 | 0.68 | 0.78 | 0.70 |
| mmol/g pulp (2 phase oxidation) | 0.91 | 0.94 | 0.84 | 0.79 | 0.74 | 0.78 | 0.79 | 0.91 | 0.82 |

TABLE 3-continued

TEMPO oxidations activated with chlorine dioxide with a Buchi reactor at a consistency of 4%.

| | Experiment | | | | | | | | |
|---|---|---|---|---|---|---|---|---|---|
| | pulp 132 | pulp 139 | pulp 140 | pulp 141 | pulp 142 | pulp 143 | pulp 144 | pulp 149 | pulp 150 |
| Viscosity (ml/g) (1 phase oxidation) | 197 | 165 | 161 | 159 | 160 | 166 | 163 | | |
| Viscosity (ml/g) (2 phase oxidation) | 465 | 304 | 298 | 246 | 284 | 269 | 344 | | |
| Selectivity after 2 phase (mmol COOH/mmol NaClO) | 0.36 | 0.37 | 0.35 | 0.32 | 0.29 | 0.31 | 0.31 | 0.37 | 0.33 |
| Temperature (° C.) | 25 | 25 | 35 | 25 | 25 | 35 | 35 | 25 | 25 |

TEMPO A
4-methoxy-TEMPO B
4-acetamido-TEMPO C

In still one test series, chlorine dioxide activated TEMPO oxidations were executed in MC pulper at pulp consistencies of 6-11%. Temperature (25-35° C.), pH (7-8) and NaClO addition were adjusted manually during oxidation. Most of the experiments were executed by 2.3 mmol NaClO/g pulp addition. The results are shown in the following table 4.

TABLE 4

MC pulper oxidations at high consistencies. Selectivity means the molar ratio COOH/hypochlorite. Part of the hypochlorite oxidizes OH-groups to aldehydes, but only ratio COOH-groups/consumed NaClO is shown.

| | Experiment | | | | | | | | |
|---|---|---|---|---|---|---|---|---|---|
| | 1 | 2 | 3 | 4 | 5 | 6 | 7 | 8 | 9 |
| Pulp consistency at start (%) | 11 | 10.1 | 10.7 | 6 | 6 | 7.8 | 7.8 | 6 | 10 |
| mmol TEMPO/g pulp | 0.03 | 0.02 | 0.04 | 0.03 | 0.04 | 0.04 | 0.025 | 0.04 | 0.04 |
| mmol NaClO/g pulp dosage | 2.3 | 2.3 | 2.3 | 2.3 | 2.3 | 2.3 | 2.3 | 2.7 | 2.7 |
| mmol COOH/g pulp | 0.79 | 0.69 | 0.8 | 0.71 | 0.72 | 0.77 | 0.71 | 0.82 | 0.85 |
| selectivity NaClO/COOH | 0.34 | 0.30 | 0.35 | 0.31 | 0.31 | 0.33 | 0.31 | 0.30 | 0.32 |

Figure 4:
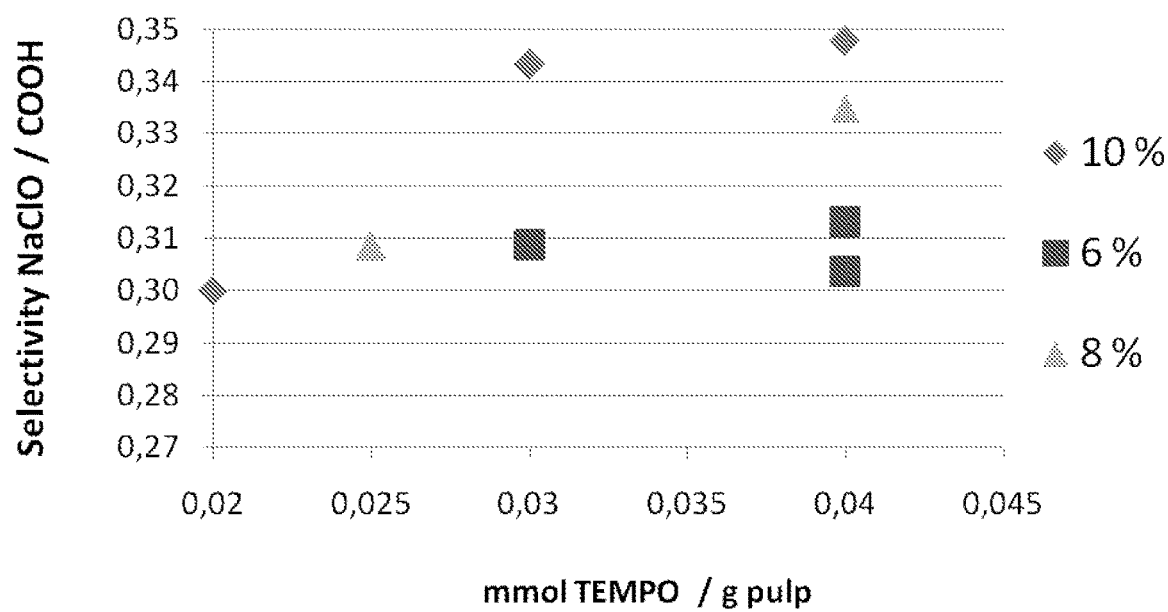

The selectivity of chlorine dioxide activated TEMPO oxidation as a function of TEMPO dosage and pulp consistency (6-10%) of the above experiments is shown also in FIG. 4, with consistency values rounded. The maximum selectivity value (formation of COOH groups/added NaClO) is 0.5 due the stoichiometry of reaction. 2 mol NaClO is consumed to formation of 1 mol COOH in cellulose because formation of COOH group from hydroxyl group goes via aldehyde intermediate.

According to these results is it obvious that higher pulp consistency increases the selectivity of chlorine dioxide activated TEMPO oxidation. The roughness of these experiments (manual pH and temperature control) does not interfere that phenomenon. The optimal conditions of oxidation according to these result is 10-11% pulp consistency and 0.03-0.04 mmol TEMPO/g pulp.

The reaction conditions can be further improved by using the arrangements shown in FIGS. 1 and 2, by using the circulation of the reaction medium through the loop as the main energy source of the mixing.

Some factors affecting the efficiency of the oxidation, especially selectivity, and applicable also to the oxidation of the cellulose at the medium consistencies of the pulp using the reaction arrangements described herein, are briefly discussed below.

The selectivity of the oxidation can be improved by pumping NaClO at a low rate into the reactor during the oxidation. It has been found that the reaction rate does not depend on the concentration of HOCl in the reaction mixture but is constant when a sufficient quantity of hypochlorite is present in the reaction. The phenomenon behind the improved selectivity is the tendency of NaClO to decompose when the pH decreases. The decomposition of NaClO is stronger if the HOCl content in the solution is high during the oxidation. In a standard reaction, all the hypochlorite is added at a time. HOCl is decomposed into dichlorinemonoxide ($Cl_2O$) which is a volatile compound. Dichlorinemonoxide is decomposed further into chlorate ($^-ClO_3$) in a reaction with hypochlorite.

Figure 5:
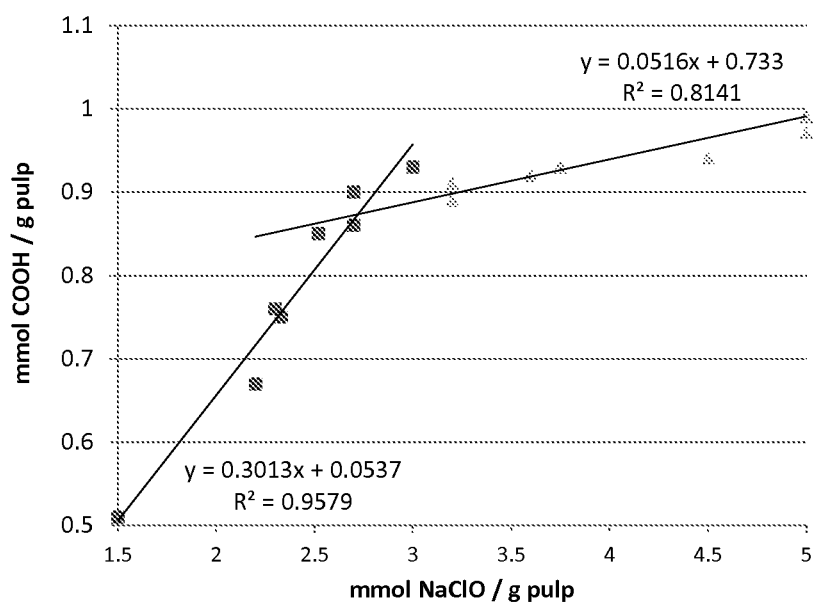

The oxidation of C6 hydroxyl groups of cellulose is fastest at the beginning of the process when there are a lot of free reactive groups left. As the number of reactive groups decreases, the oxidation rate becomes lower and a significant change takes place when the number of free reactive groups (amorphous cellulose and part of crystalline cellulose) is very small and the oxidation is directed to the crystalline cellulose. Thus, the oxidation proceeds primarily via degradation of the crystalline cellulose. FIG. 5 shows the acid value (mmol COOH per g of pulp) of TEMPO oxidations activated with chlorine dioxide as a function of hypochlorite dosage in a one-step process. The figure shows that up to the oxidation level of 0.9 mmol/g pulp the 1-step method is efficient as to the consumption of the main oxidant, hypochlorite.

Of the amorphous C6 OH groups, 83 to 98% are easily accessed; the corresponding figure in crystalline ranges is 10 to 15%. The graph of FIG. 5 shows that cellulose can be easily oxidized to the acid value range of 0.8 to 0.9 mmol of COOH per g of pulp. After this, the reaction rate becomes lower and the consumption of NaClO increases and the viscosity decreases as a result of degradation of polymers. The acid value range 0.8 to 0.9 can be kept as an optimum target for selective oxidation. When a lower reaction rate and a higher temperature are applied, the content of remaining aldehydes in the product after step 1 is typically <0.2 mmol per g of pulp, which is clearly lower than in a typical reaction in which the level is between 0.2 and 0.35 mmol per g of pulp. This is probably due to the lower reaction rate, wherein there is also more time for oxidation reactions of aldehydes to carboxylates to take place.

Example of Making NFC

The oxidized pulp (0.82 mmol COOH/g pulp) sample was fibrillated using "Atrex" dispergator, which is a device which subjects the pulp to impacts from opposite directions at a high frequency, consisting of concentric cylindrical rotors with through flow passages formed by spaced impact blades.

Four passes through the device were used. Gel properties of nanofibrillar celluloses were measured using rheometer and turbidity with turbidometer.

The achieved properties were: Zero shear viscosity 18 000 Pa·s, yield stress 22 Pa and turbidity 24 NTU.

Turbidity Measurement

Turbidity may be measured quantitatively using optical turbidity measuring instruments. There are several commercial turbidometers available for measuring quantitatively turbidity. In the present case, the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted within a liquid, preferably in water, to a concentration below the gel point of said nanofibrillar cellulose, and turbidity of the diluted sample is measured. Said concentration where the turbidity of the nanofibrillar cellulose samples is measured is 0.1%. The mean value and standard deviation are calculated from the obtained results, and the final result is given as NTU units. HACH P2100 Turbidometer, with a 50 ml measuring vessel was used for turbidity measurements.

Rheometric Measurement

The NFC was diluted with deionised water to a concentration of 0.5 and 200 g of the mixture was homogenised with a Büchi-mixer (B-400, max 2100 W, Büchi Labortechnik AG, Switzerland) for 3×10 s.

The viscosity of the NFC dispersions was measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they were allowed to rest for 5 min before the measurement was started. The steady state viscosity was measured with a gradually increasing shear stress (proportional to applied torque) and the shear rate (proportional to angular velocity) was measured. The reported viscosity (=shear stress/shear rate) at a certain shear stress was recorded after reaching a constant shear rate or after a maximum time of 2 min. The measurement was stopped when a shear rate of 1000 s−1 was exceeded.

The invention claimed is:

1. A method for catalytic oxidation of cellulose pulp comprising:
    activating a heterocyclic nitroxyl catalyst by means of an activator,
performing the catalytic oxidation of cellulose pulp in the presence of the heterocyclic nitroxyl catalyst and a main oxidant acting as oxygen source in a reactor in a reaction medium which is at medium consistency of cellulosic pulp, which is above 6%,
during the oxidation of cellulose pulp, mixing the reaction medium comprising the cellulose pulp at a consistency of above 6% in the reactor, wherein mixing the reaction medium comprises:
    removing the reaction medium from the reactor through a circulation loop; and
    returning the reaction medium back to the reactor.

2. The method according to claim 1, wherein the reaction medium is at the medium consistency of cellulosic pulp in the range of 8-12%.

3. The method according to claim 1, wherein at least part of the main oxidant is added to the circulation of the reaction medium.

4. The method according to claim 1, wherein chlorine dioxide or tertiary amine is used as the activator of the heterocyclic nitroxyl catalyst.

5. The method according to claim 1, wherein hypochlorite is used as the main oxidant.

6. The method according to claim 1, further comprising oxidizing the cellulose pulp to a desired level in two steps by
    using chlorine dioxide as the activator and hypochlorite as the main oxidant in a first catalytic step, and
    using chlorite as oxidant completing the oxidation in a second step where pH is lower compared with the first step.

7. The method according to claim 6, wherein during the first step pH is 6 to 10, and during the second step pH is 1.5 to 4.

8. The method according to claim 5, wherein the catalytic oxidation is performed at pH 7-9 and at temperature of 20-50° C.

9. The method according to claim 1, wherein the oxidation is performed to a level of 0.5-1.4 mmol COOH/g pulp.

10. The method according to claim 1, wherein after the oxidation, the oxidized cellulose pulp is treated further.

11. The method according to claim 1, wherein the cellulose pulp subjected to oxidation is the cellulose in fibrous raw material.

12. The method according to claim 1, further comprising adding a pH control agent to the circulation of the reaction medium.

13. The method according to claim 6, wherein during the first step pH is 7.5 to 8.5 and during the second step pH is 2 to 3.

14. The method according to claim 5, wherein the catalytic oxidation is performed at pH 7-9 and at temperature of 25-35° C.

15. The method according to claim 1, wherein the oxidation is performed to a level of 0.6-1.1 mmol COOH/g pulp.

16. The method according to claim 1, wherein the oxidation is performed to a level of 0.7-0.9 mmol COOH/g pulp.

17. The method according to claim 10, comprising
    performing the catalytic oxidation of cellulose in fibrous raw material to obtain fibrous material containing oxidized cellulose, and
    disintegrating fibrous raw material containing the oxidized cellulose to nanofibrillar cellulose.

18. The method according to claim 1, wherein the method is in the absence of a bromine compound.

19. The method according to claim 1, wherein during the oxidation of the cellulose pulp, the reaction medium is at a temperature that does not exceed 40° C.

20. The method according to claim 1, wherein the main oxidant is continuously added to the reaction medium during the oxidation of the cellulose pulp.

21. Method for making a cellulose product, comprising subjecting fibrous starting material to oxidation by the method according to claim 1 to obtain oxidized fibrous material, and disintegrating the oxidized fibrous raw material.

22. The method according to claim 21, wherein the oxidized fibrous raw material is disintegrated to nanofibrillar cellulose.

23. The method according to claim 22, wherein the fibrils of the nanofibrillar cellulose have mean diameter of 2 to 20 nm and mean length of 0.3 to 5 μm.

24. The method according to claim 22, wherein the nanofibrillar cellulose has the turbidity below 70 NTU (nephelometric turbidity units) as measured at 0.1% concentration in water.

25. The method according to claim 22, wherein the nanofibrillar cellulose has the zero shear viscosity of 10000 to 50000 Pa·s and yield stress of 8-40 Pa as measured at 0.5% concentration in water.

26. The method according to claim 22, wherein the carboxylate content of the oxidized cellulose is at least 0.6 mmol COOH/g pulp.

27. The method according to claim 21, wherein the fibrous starting material is fibers obtained from plant material.

28. The method according to claim 22, wherein the nanofibrillar cellulose has the turbidity between 20 to 60 NTU (nephelometric turbidity units) as measured at 0.1% concentration in water.

29. The method according to claim 22, wherein the nanofibrillar cellulose has the zero shear viscosity of 20000 to 50000 Pa·s and yield stress of 10-30 Pa as measured at 0.5% concentration in water.

30. The method according to 22, wherein the carboxylate content of the oxidized cellulose is 0.7-1.4 mmol COOH/g pulp.

\* \* \* \* \*